United States Patent [19]

Bussiere

[11] Patent Number: 5,040,617
[45] Date of Patent: Aug. 20, 1991

[54] ACTIVE HARROW

[75] Inventor: Raymond J. Bussiere, Saskatchewan, Canada

[73] Assignee: Hi-Line Manufacturing Inc., Vonda, Canada

[21] Appl. No.: 527,207

[22] Filed: May 23, 1990

[30] Foreign Application Priority Data

Apr. 11, 1990 [CA] Canada ................................ 2014441

[51] Int. Cl.$^5$ ...................... A01B 21/02; A01B 21/04; A01B 23/00
[52] U.S. Cl. .................................. 172/554; 172/177; 172/540
[58] Field of Search ............... 172/554, 548, 540, 532, 172/254, 177, 175, 174, 122, 119, DIG. 14, 141, 603, 645, 651, 213

[56] References Cited

U.S. PATENT DOCUMENTS

| 322,567 | 7/1885 | Stonesifer | 172/552 |
| 392,697 | 11/1888 | Smith et al. | 172/554 |
| 500,349 | 6/1893 | Pridmore . | |
| 704,897 | 7/1902 | May | 172/554 |
| 1,196,954 | 9/1916 | Huebsch . | |
| 1,610,311 | 12/1926 | Paul | 172/141 |
| 1,639,104 | 8/1927 | Paul | 172/141 |
| 2,430,148 | 11/1947 | Traver . | |
| 2,538,594 | 1/1951 | Rutter | 172/141 |
| 2,591,851 | 4/1952 | Milla | 172/141 |
| 2,954,084 | 9/1960 | Swertfeger . | |
| 3,047,075 | 7/1962 | Frank | 172/141 |
| 3,306,371 | 2/1967 | Bush | 172/540 |
| 3,504,748 | 4/1970 | Croft | 172/540 |
| 3,542,139 | 11/1970 | Mowbray . | |
| 4,133,390 | 1/1979 | Reaume | 172/548 |

FOREIGN PATENT DOCUMENTS

| 1223768 | 7/1987 | Canada | 172/548 |
| WO88/00002 | 1/1988 | PCT Int'l Appl. . | |

OTHER PUBLICATIONS

Calkins Flyer, Tandem Skew Treader, Calkins Manufacturing Co.
Brochure—Phoenix Rotary "Multi-Spike" Harrow.

Primary Examiner—Dennis L. Taylor
Assistant Examiner—Spencer Warwick
Attorney, Agent, or Firm—Adrian D. Battison; Stanley G. Ade; Murray E. Thrift

[57] ABSTRACT

An active harrow comprises a rotatable cylindrical body on the outer surface of which is mounted a plurality of tines which project outwardly for engaging the ground. The rotatable body is carried in a yoke and supported from a tool bar in a manner which allows the axis of the rotatable body to be adjusted relative to the tool bar. The tines are inclined so that they lie in axial planes but inclined relative to the radial plane of an angle in order of 20° to 30°. Each tine includes a main body portion and an end portion which is cranked. This orientation of the tines provides an effective harrowing action but prevents accumulation of trash.

20 Claims, 2 Drawing Sheets

ACTIVE HARROW

BACKGROUND OF THE INVENTION

This invention relates to a ground working implement of the type including a rotatable body which has a plurality of tines mounted on the body for rotation therewith so that the tines can work the soil as the element is drawn over the ground. Devices of this type are often known as active harrows.

A conventional harrow includes a plurality of spring tines each of which is formed from spring steel with a lower tine portion and an upper coil portion attached to a fixed rod. As the harrow is drawn across the ground, the lower tine portion engages the ground and works the ground due to the flexible movement of the tine caused by the upper coil portion.

Harrows of this type have disadvantages firstly that the working of the soil is relatively limited. Secondly, the harrow has significant difficulty working in conditions where there is a collection of straw or other plant material, known as trash, on top of or in the upper layer of the soil. This plant material will collect around the harrow tines leading to a raking action and to an unacceptable collection of the plant material.

In current proposals for reduced till or no till farming practices, significantly greater amount of straw and other plant material is left as trash in the upper surface of the soil and therefore modern equipment must be designed in a manner to accommodate this material while providing a satisfactory or preferably increased level of harrowing action.

Various proposals have been made for rotating type harrows or active harrows in similar ground working implement in which there is a body rotatable generally about an axis parallel to the ground with the body carrying a plurality of harrow tines extending outwardly from the surface for engaging the ground. Devices of this type are achieving some success but up until now have had significant difficulty in accommodating high levels of trash and in providing the required of level of harrowing action.

SUMMARY OF THE INVENTION

It is one object of the present invention, therefore, to provide an improved ground working implement.

According to the invention, therefore, there is provided an active harrow element comprising a support frame, an elongate substantially rigid support body mounted on the support frame for rotation relative to the frame about an axis longitudinal of the body and defining a support surface means surrounding the axis, a plurality of harrow tines mounted on the support body such that each projects outwardly from a base end of the tine at the support surface means to an outer end of the tine, the tines being arranged at longitudinally spaced positions along the length of the body and at angularly spaced positions around the axis, means for mounting the frame for movement across the ground with the axis of the body parallel to the ground and transverse to the direction of movement such that the outer ends of the harrow tines engage the ground in a rolling action of the support body, each of the harrow tines having at least a main body portion thereof inclined at an acute angle less than 90° to a radial plane surrounding the axis of the support body which radial plane contains the base end of the tine such that a radial plane containing the outer end of the tine is spaced in an axial direction relative to the radial plane containing the base end of the tine.

Surprisingly the angle of the harrow tine to the elongate rotating body which is preferably a rigid cylinder enables the harrow tine to pass through the ground and over the ground without significantly collecting trash.

According to a further feature of the invention each tine further includes an end portion cranked at an angle to the main body portion of the tine in a direction to trail rearwardly of the main body portion relative to the direction of intended rotation of the support body.

According to a yet further feature of the invention, the end portion lies in a common plane with the main body portion which plane is inclined to said radial plane containing the base end of the tine at said acute angle.

According to a still further feature of the invention, said support frame includes means for attachment to a tool bar for transportion of the support body in a direction of working movement, said attachment means being arranged such that said radial plane containing the base end of the tine lies at a second acute angle relative to the direction of working movement, said tines all being oriented such that they are inclined to lean toward one end of the support body and such that the first acute angle of the tines relative to said radial plane containing the base end of the tine lies on a side of the radial plane which side is opposite to said second acute angle of said direction of working movement relative to said radial plane.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
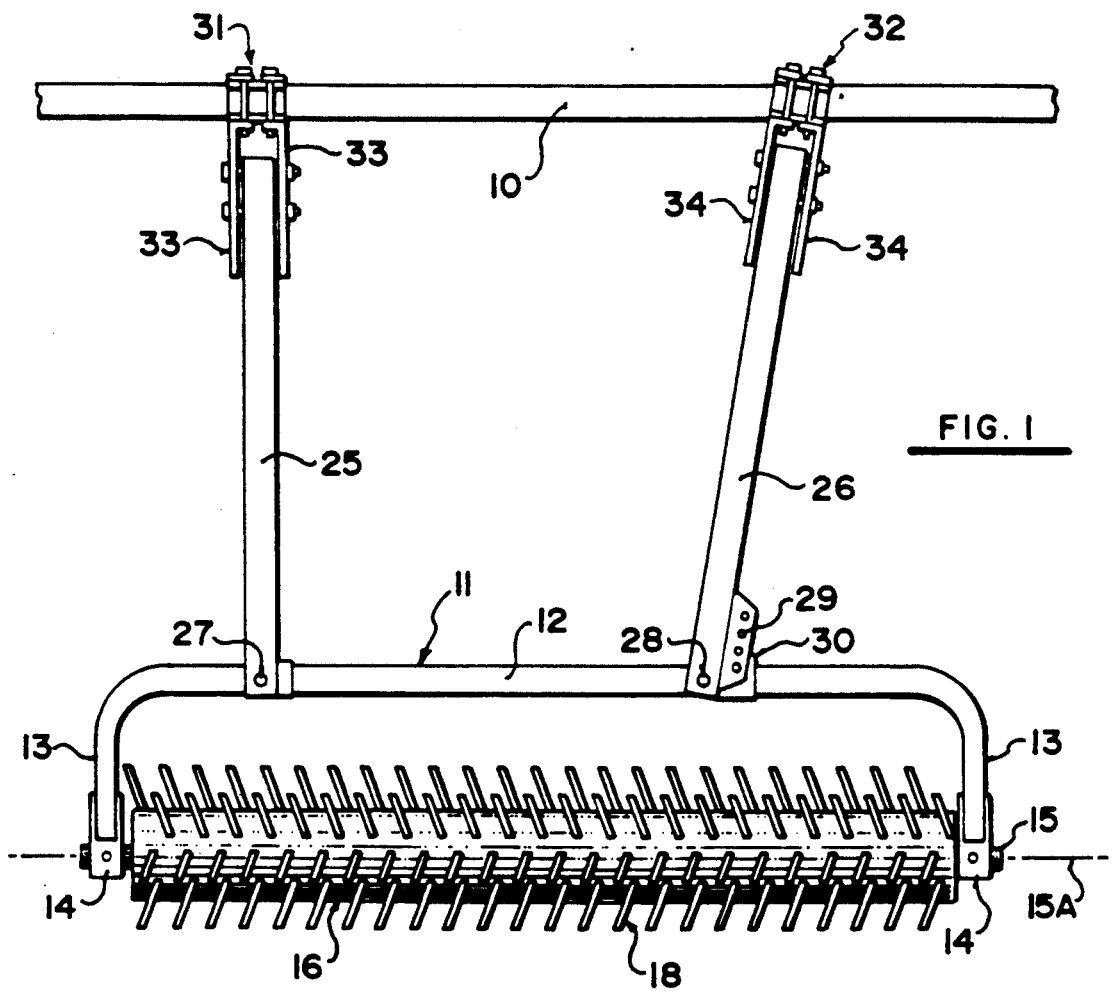
FIG. 1 is a top plan view of a ground working implement according to the present invention.

A tool bar is indicated at 10 of a conventional type which will in practice be mounted upon ground wheels for transport across the ground and may comprise the rear tool bar of a seeder or may comprise dedicated equipment for transporting the harrow described hereinafter.

The harrow comprises a yoke 11 in the form of a bar having a horizontal portion 12 and a pair of ends 13 which are bent at right angles to the bar 12 and extend downwardly therefrom to a pair of bearings 14 mounted on the lower end of the arms 13. The bearings 14 surround a shaft 15 which is thus supported for rotation about a horizontal axis 15A of the shaft parallel to the bar 12 and the parallel to the ground. The shaft 15 carries an elongate cylindrical body 16 having a cylindrical outer surface surrounding the axis defined by the shaft and support relative to the shaft by end walls 17.

The cylindrical wall 16 is formed of steel and is substantially continuous and imperforate.

Figure 2:
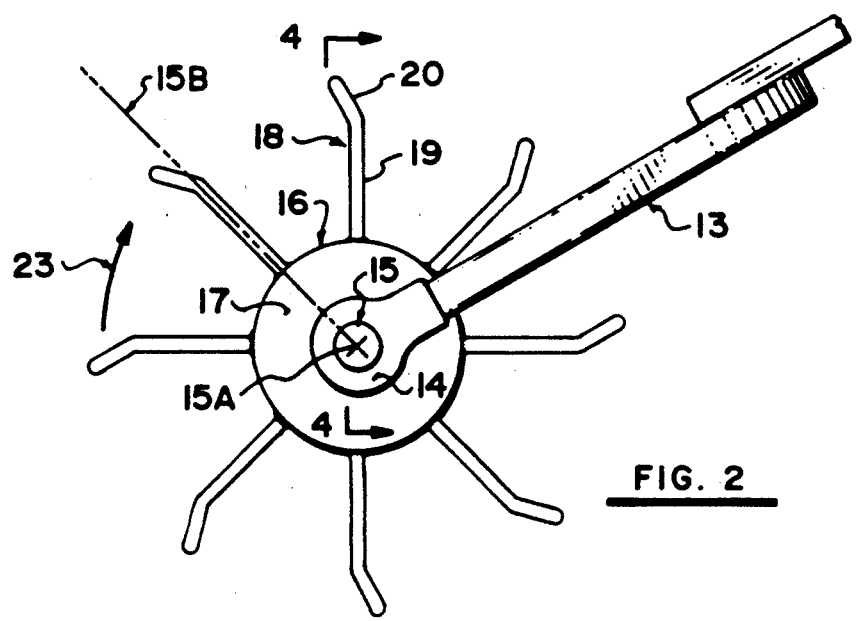
FIG. 2 is an end elevational view of the implement of FIG. 1.

Attached to the outer surface of the peripheral wall 16 is a plurality of harrow tines 18 which project outwardly from the outer surface for engaging the ground. The harrow tines are all substantially identical. The harrow tines are mounted in rows as best shown in FIG. 2 with the rows being angularly spaced around the wall 16. In the example shown in FIG. 2 there are eight such rows of tines but this number can be increased or decreased in accordance with the requirements and in accordance with the diameter of the wall 16. In one preferred example, the number of tines at each axially spaced position is six. The tines at a next adjacent position are offset angularly with regard to the tines at a first position by an angle equal to one half of the angle between the tines at the first position.

Figure 3:
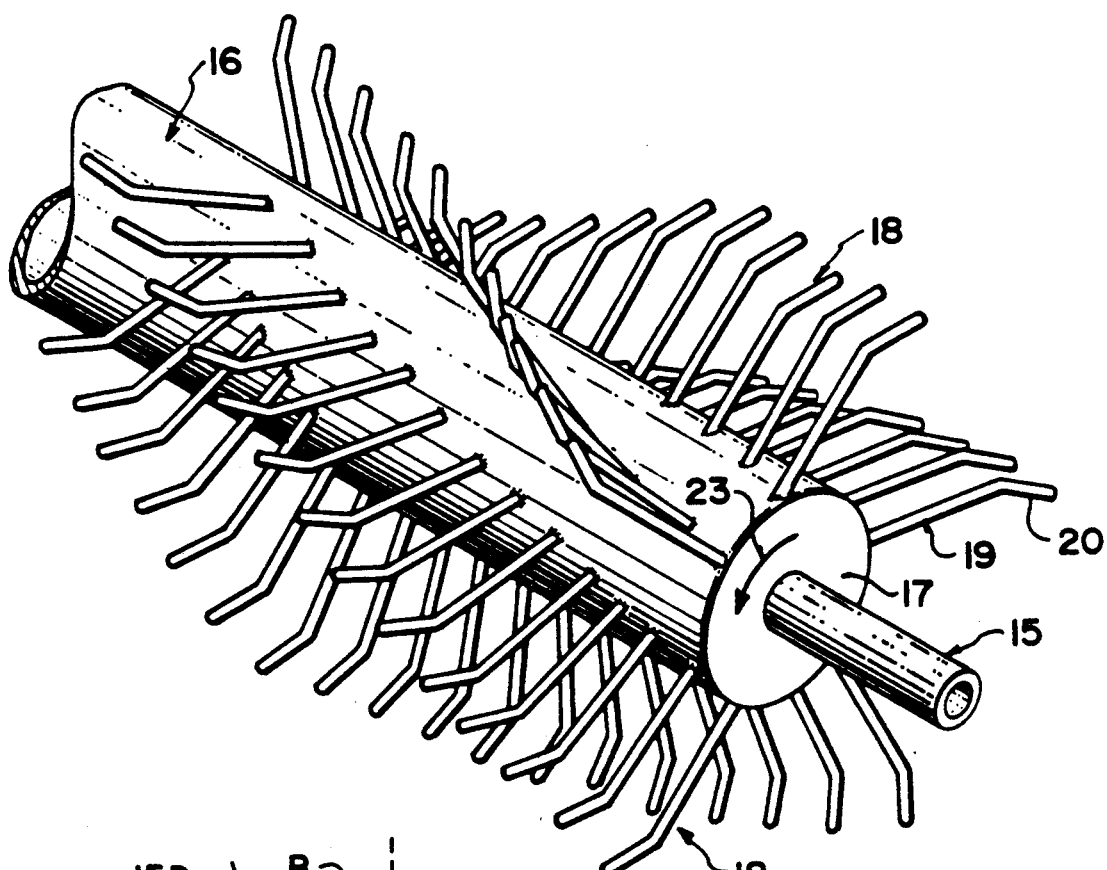
FIG. 3 is an isometric view of one portion of the rotatable element and supported tines of the ground working implement of FIG. 1.

Each of the harrow tines has the main body portion 19 and an end portion 20 cranked or bent relative to the main body portion as best shown in FIGS. 2 and 3. In one embodiment as an example the main body portion can have a length lying in the range three inches to five inches with the end portion having the length of the order of two inches. The angle between the end portion and the main body portion can be in the range 20° to 30°.

Figure 4:
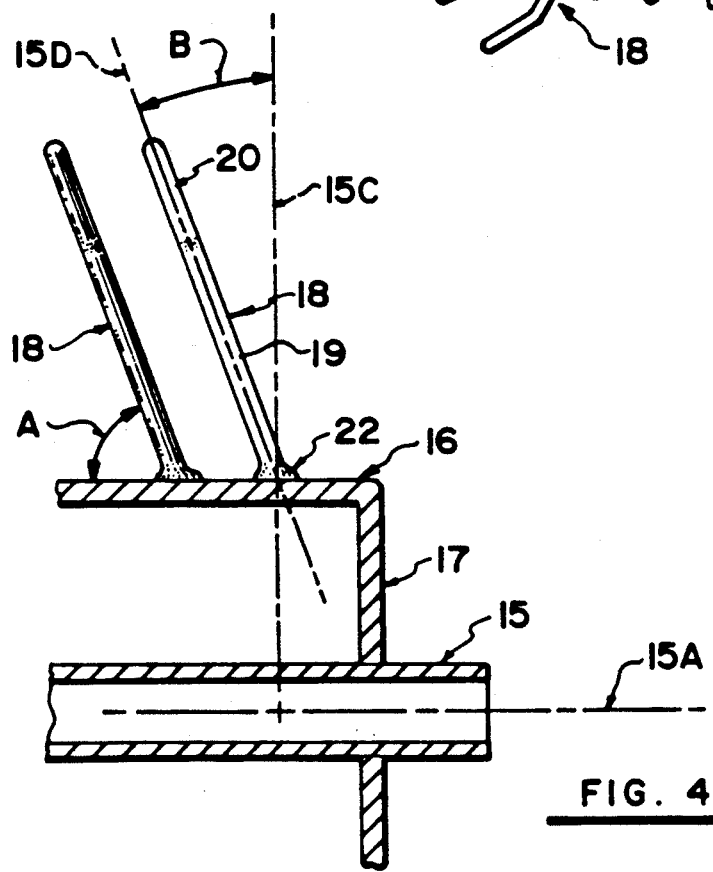
FIG. 4 is a cross sectional view along lines 4—4 of FIG. 2.

Each tine is separately welded to the outer surface of the wall 16 as indicated in FIG. 4 by the weld line 22. The weld is carried out by a high pressure welding technique allowing the base of the tine to be directly attached to the outer surface in a manner which remains rigidly attached with little or no flexing of the tine. In one practical example the tine has a diameter of the order of ⅜ inch and thus is formed from relatively heavy rod providing little opportunity for flexing and providing significant strength to resist damage from engagement with stones, rocks or other obstacles.

The harrow tines as described above and as conventionally used in a harrowing action are shaped in the form of a rod, which thus has smooth curved or rounded side surfaces, as viewed in a transverse cross section, so as to avoid providing any sharp cutting edges which would cut into the ground. The harrow tine action is thus different from a cultivator or plough action in that the cultivator or plough cuts the soil to lift or tear one part of the soil relative to another. The harrow tine carries on no cutting action but merely acts to apply movement and pressure to the upper surface of the soil in a levelling and packing operation. In addition therefore, between each tine and the next is provided merely the peripheral surface of the support body which is smooth and free from cutting edges, discs or the like so that no cutting action will take place in this area and the tines only engage the ground. Thus the ground engaging means of the harrow element consist solely of the tines themselves.

The orientation of the tines is best shown in FIGS. 2 and 4. From FIG. 2 it will be noted that the tines lie so that in the end elevation of FIG. 2 a main body portion of each tine extends substantially radially outwardly from the axis. The main body portion 19 of each tine thus lies in an axial plane indicated in FIG. 2 at 15B. An axial plane is defined herein as a plane containing the axis 15. The end portion is however cranked out of the axial plane in a direction rearwardly relative to the direction of motion indicated at 23 in FIGS. 2 and 3.

The orientation is further visible from FIG. 4 in which it will be noted that each time is inclined relative to a radial plane 15C so that it lies at an angle less than 90° as indicated at angle A. This angle preferably lies in the range 60° to 70° so that the angle B between a radial plane 15C intersecting the base of the tine and the tine lies in the range 20° to 30°. A radial plane, such as the plane 15C, is defined herein as a plane in which each line joining a point in the plane to the point of intersection of the axis 15 and the plane lies at right angles to the axis 15. In addition the upper part 20 of each tine is bent relative to the main body portion such that the whole of the tine lies in a plane 15D at the angle B to the plane 15C.

This orientation of the tine has been found surprisingly to allow the tines to discard any trash in the form of straw or other plant material which tends to collect around the tines. In one practical example the diameter of the wall 16 is in the range 4½ to 9 inches. A space between each tine and the next adjacent tine is preferably in the range 2 to 6 inches. This positioning, orientation and spacing of the tine provides an effective harrowing action as the device is drawn across the ground.

The effect of the harrowing action is also improved by an adjustment of the angle of the yoke 12 relative to the tool bar 10. The yoke is coupled to the tool bar by a pair of arms 25 and 26 each of which is coupled to the horizontal bar 11 by a single vertical bolt 27, 28. In addition the angle of the arm 26 relative to the yoke can be adjusted by selecting one of the plurality of holes 29 which are coupled to a plate 30 on the yoke. The arms 25 and 26 are connected to the tool bar by bolts 31, 32 which connect to a pair of plates 33 and 34. The position of the plates relative to the arm can be adjusted to accommodate the changes in angle and thus the difference in length between the tool bar and the respective side of the yoke 12. It will be appreciated that an increase in the angle between the yoke and the tool bar significantly increases the activeness or ground working effect of the harrow tines on the ground. The adjustment can be between 0° as shown in FIG. 2 and an angle as much as 20°-30°.

As shown in FIG. 1, with the angle of the axis 15A adjusted to the range of 20° to 30° as described above, the tines are angled so that they project toward the end of the support body 16 which is furthest away from the tool bar 10. Thus a direction of intended working motion indicated at 15E which is at right angles to the tool bar 10 lies on a side of the radial plane 15C which is opposite to the plane 15D of the tines. This increased inclination of the tines is particularly effective in the harrowing action. The first acute angle between the radial plane and the direction of motion is indicated at 15F and the second acute angle (on the opposite side of the radial plane) between the radial plane and the plane of the tine is indicated at 15G.

The aggressiveness of the harrowing action can be significantly increased by reversing the direction of the tines so that the end portions project forwardly rather than rearwardly as shown in FIG. 2.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An active harrow element comprising a support frame, an elongate substantially rigid support body mounted on the support frame for rotation relative to the frame about an axis longitudinal of the body and defining a support surface surrounding the axis, a plurality of harrow tines mounted on the support body such that each projects outwardly from a base end of the tine at the support surface means to an outer end of the tine, the tines being arranged at longitudinally spaced positions along the length of the body and at angularly spaced positions around the support, surface means for mounting the frame for movement across the ground with the axis of the body parallel to the ground and generally transverse to the direction of movement such that the outer ends of the harrow tines engage the ground in a rolling action of the support body, each of the harrow tines having at least a main body portion thereof inclined at a tine acute angle less than 90° to a radial plane perpendicular to the axis of the support body which radial plane contains the base end of the tine such that a radial plane containing the outer end of the tine is spaced in an axial direction relative to the radial plane containing the base end of the tine each harrow tine includes an end portion thereof cranked at an angle to the main body portion of the tine.

2. The invention according to claim 1 wherein the support body comprises a cylindrical drum and wherein all of the tines are inclined such that they all lean toward one end of the support body.

3. The invention according to claim 1 wherein all of the tines are inclined so that the angle of each tine is equal to the angle of the other tines.

4. The invention according to claim 1 wherein the tine angle between each tine and the radial plane lies in the range 20° to 30°.

5. The invention according to claim 1 wherein the end portion is cranked at an angle so as to lie in a common plane with the main body portion, which plane is inclined to said radial plane at said angle.

6. The invention according to claim 1 wherein the length of the main body portion lies in the range three inches to five inches.

7. The invention according to claim 1 wherein the end portion is of the order of two inches in length.

8. The invention according to claim 1 wherein the end portion is cranked at an angle of the order of 30° to the main body portion.

9. The invention according to claim 1 wherein the main body portion of each tine extends outwardly from the support surface so as to lie in an axial plane of the support body.

10. The invention according to claim 1 wherein the frame comprises a yoke member having bearings at outer ends of the yoke member for supporting the support body for rotation about the axis of the support body defined by the bearings and means for coupling the yoke to a tool bar for trailing of the yoke behind the tool bar.

11. The invention according to claim 10 wherein said coupling means includes means for adjusting a trailing angle of the yoke relative to the tool bar.

12. The invention according to claim 1 wherein said support frame includes means for attachment to a tool bar for transportation of the support body in a direction of working movement, said attachment means being arranged such that a radial plane of the axis lies at a directional acute angle relative to the direction of working movement.

13. The invention according to claim 12 wherein the directional acute angle lies in the range 22° to 30°.

14. The invention according to claim 12 wherein said tine acute angle of said tines relative to said radial plane lies on a side of said radial plane which is opposite to said directional acute angle of said direction of working movement relative to said radial plane.

15. An active harrow element comprising a support frame, an elongate substantially rigid support body mounted on the support frame for rotation relative to the frame about an axis longitudinal of the body and defining a support surface surrounding the axis, a plurality of tines mounted on the support body such that each projects outwardly from a base end of the tine at the support surface means to an outer end of the tine, the tines being arranged at longitudinally spaced positions along the length of the body and at angularly spaced positions around the support surface means for mounting the frame for movement across the ground with the axis of the body parallel to the ground and generally transverse to the direction of movement such that the outer ends of the tines engage the ground in a rolling action of the support body, each of the tines having at least a main body portion thereof inclined at a tine acute angle less than 90° to a radial plane perpendicular to the axis of the support body which radial plane contains the base end of the tine such that a radial plane containing the outer end of the tine is spaced in an axial direction relative to the radial plane containing the base end of the tine, each of the tines comprising an elongate body having side surfaces which are curved in cross section transverse to the length of the tine so as to avoid a cutting action of the tine in the ground.

16. The invention according to claim 15 wherein the support body comprises a cylindrical drum and includes ground engaging means extending from the support surface of the drum consisting solely of the tines, such that there is no cutting action on the ground between one tine and the next adjacent tine.

17. An active harrow element comprising a support frame, an elongate substantially rigid support body mounted on the support frame for rotation relative to the frame about an axis longitudinal of the body and defining a support surface surrounding the axis, a plurality of tines mounted on the support body such that each projects outwardly from a base end of the tine at the support surface means to an outer end of the tine, the tines being arranged at longitudinally spaced positions along the length of the body and at angularly spaced positions around the support surface means for mounting the frame for movement across the ground with the axis of the body parallel to the ground and generally transverse to the direction of movement such that the outer ends of the tines engage the ground in a rolling action of the support body, said support frame mounting the support body for rotation in an intended direction of rotation as it is rotated in said rolling action, each of the tines having at least a main body portion thereof inclined at a tine acute angle less than 90° to a radial plane perpendicular to the axis of the support body which radial plane contains the base end of the tine such that a radial plane containing the outer end of the tine is spaced in an axial direction relative to the radial plane containing the base end of the tine, each said tine further including an end portion cranked at an angle to the main body portion of the tine in a direction to trail rearwardly of the main body portion relative to said direction of intended rotation of the support body.

18. An active harrow element comprising a support frame, an elongate substantially rigid support body mounted on the support frame for rotation relative to the frame about an axis longitudinal of the body and defining a support surface surrounding the axis, a plurality of tines mounted on the support body such that each projects outwardly from a base end of the tine at the support surface means to an outer end of the tine, the tines being arranged at longitudinally spaced positions along the length of the body and at angularly spaced positions around the support surface, means for mounting the frame for movement across the ground with the axis of the body parallel to the ground and generally transverse to the direction of movement such that the outer ends of the tines engage the ground in a rolling action of the support body, each of the tines having at least a main body portion thereof inclined at a tine acute angle less than 90° to a radial plane perpendicular to the axis of the support body which radial plane contains the base end of the tine such that a radial plane containing the outer end of the tine is spaced in an axial direction relative to the radial plane containing the base end of the tine, each said tine further including an end portion cranked at an angle to the main body portion of the tine so as to lie in a common plane with the main body portion, which plane is inclined to said radial plane at said angle.

19. An active harrow element comprising a support frame, an elongate substantially rigid support body mounted on the support frame for rotation relative to the frame about an axis longitudinal of the body and defining a support surface surrounding the axis, a plurality of tines mounted on the support body such that each projects outwardly from a base end of the tine at the support surface means to an outer end of the tine, the tines being arranged at longitudinally spaced positions along the length of the body and at angularly spaced positions around the support surface, means for mounting the frame for movement across the ground with the axis of the body parallel to the ground and generally transverse to the direction of movement such that the outer ends of the tines engage the ground in a rolling action of the support body, each of the tines having at least a main body portion thereof inclined at a first acute angle less than 90° to a radial plane perpendicular to the axis of the support body which radial plane contains the base end of the tine such that a radial plane containing the outer end of the tine is spaced in an axial direction relative to the radial plane containing the base end of the tine, said support frame including means for attachment to a tool bar for transportation of the support body in a direction of working movement, said attachment means being arranged such that said radial plane lies at a second acute angle relative to the direction of working movement, said tines all being oriented such that they are inclined to lean toward one end of the support body and such that the first acute angle of the tines relative to said radial plane lies on a side of the radial plane which side is opposite to said second acute angle of said direction of working movement relative to said radial plane.

20. The invention according to claim 19 wherein the first and second acute angles lie in the range 20° to 30°.

* * * * *

UNITED STATES PATENT AND TRADEMARK OFFICE
CERTIFICATE OF CORRECTION

PATENT NO. : 5,040,617
DATED : August 20, 1991
INVENTOR(S) : Raymond J. Bussiere It is certified that error appears in the above-identified patent and that said Letters Patent is hereby corrected as shown below:

In the drawings replace Figure 1 with the following.

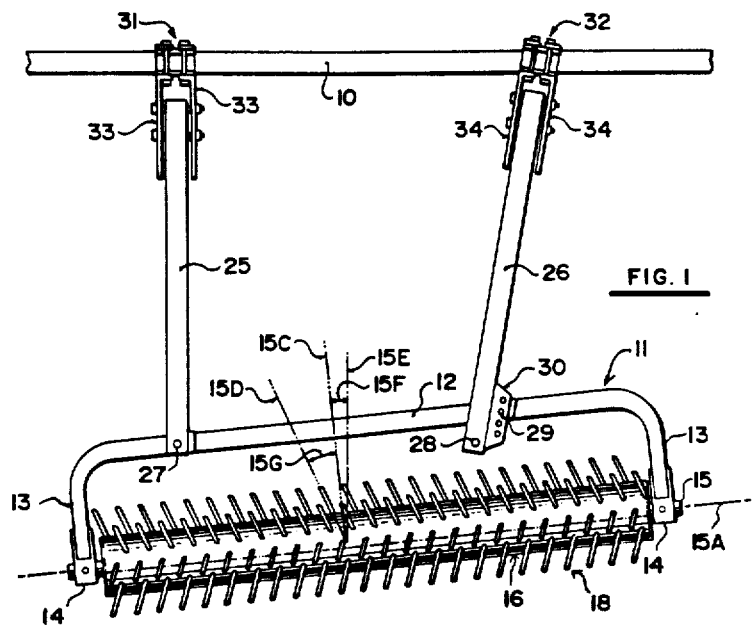

FIG. 1

Signed and Sealed this

Second Day of March, 1993

Attest:

STEPHEN G. KUNIN

Attesting Officer

Acting Commissioner of Patents and Trademarks